United States Patent
Reynolds et al.

[15] 3,690,704
[45] Sept. 12, 1972

[54] PLASTIC TUBING CONNECTOR

[72] Inventors: Frank L. Reynolds, Monroe; Alfred C. Langer, Brookfield; Ellsworth Tweedie, Milford, all of Conn.

[73] Assignee: Frigitronics of Conn., Inc., Shelton, Conn.

[22] Filed: Sept. 9, 1970

[21] Appl. No.: 70,751

[52] U.S. Cl. ............................285/244, 285/248
[51] Int. Cl. ...........................................F16l 33/00
[58] Field of Search.....................285/248, 246, 244

[56] References Cited

UNITED STATES PATENTS

| 3,120,966 | 2/1964 | Lyon | 285/247 X |
| 3,476,414 | 11/1969 | Condrac | 285/354 X |
| 3,193,310 | 7/1965 | Hildner | 285/248 X |

FOREIGN PATENTS OR APPLICATIONS

| 121,840 | 1/1919 | Great Britain | 285/248 |

Primary Examiner—Andrew V. Kundrat
Attorney—Buckles and Bramblett

[57] ABSTRACT

There is disclosed a connector for tubing made from plastic having cold flow characteristics. A tubular insert is placed in the end of the plastic tubing. A tubular sleeve is positioned over the tube. Elastomeric O-rings are mounted on the tubing at the end of the sleeve. An internally threaded tubular coupling member is threaded onto the plastic tubing, compressing the O-rings between the member and the end of the sleeve. The coupling member is secured to the sleeve to retain the O-rings in their compressed state.

9 Claims, 5 Drawing Figures

Patented Sept. 12, 1972
3,690,704
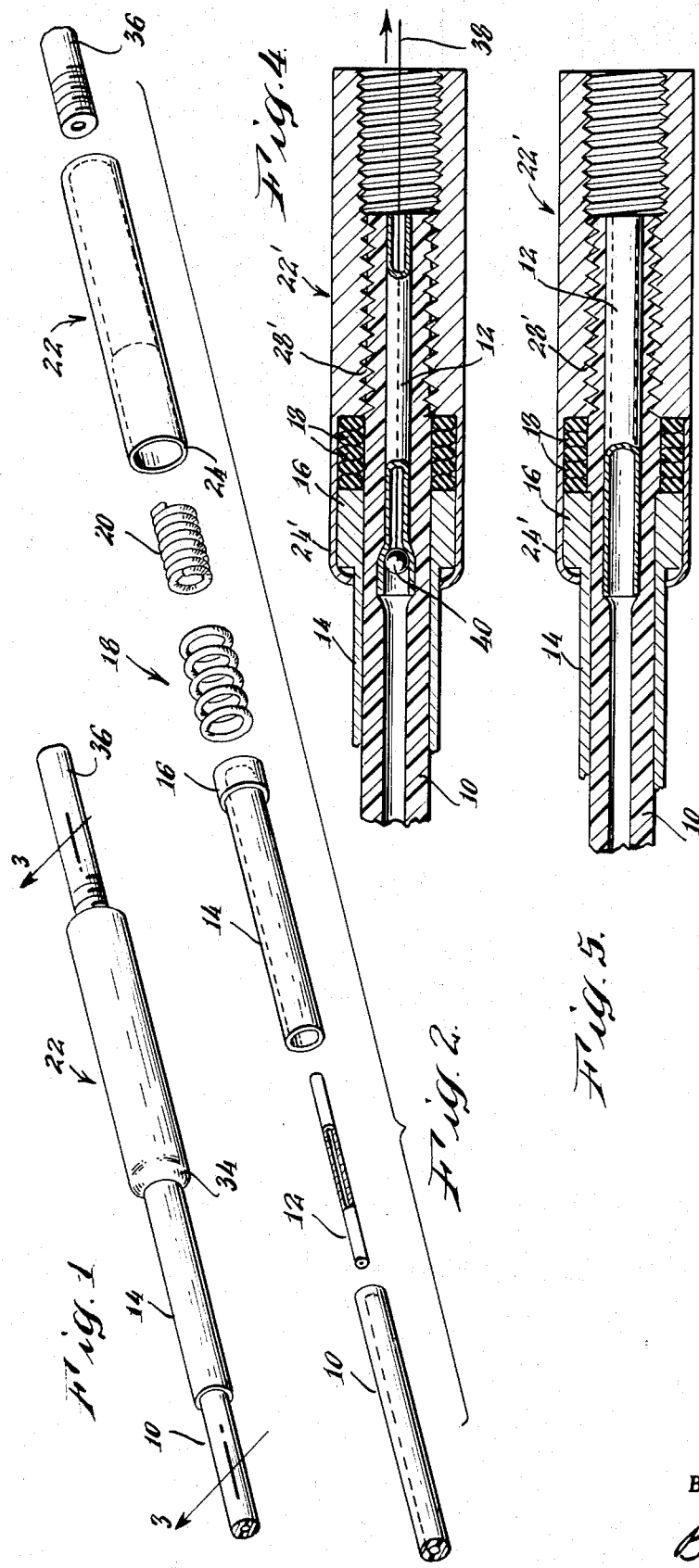
INVENTORS.
Frank L. Reynolds
BY Alfred C. Langer
Ellsworth Tweedie
Bradley & Bramblett
ATTORNEYS

PLASTIC TUBING CONNECTOR

BACKGROUND OF THE INVENTION

It is often required to use plastic tubing for the delivery of relatively high pressure gas. In some circumstances the tubing must satisfy other requirements than the ability to withstand high pressure. For example, one type of cryosurgical device employs high pressure gas for cooling by the Joule-Thomson effect. The delivery system for such a device should be lightweight and flexible. In addition, it should be chemically inert and capable of withstanding autoclaving. Two of the plastics which are most suitable for tubing of this nature are polytetrafluoroethylene and nylon. Unfortunately, however, both plastics have a definite cold flow tendency under high compression. Accordingly, users of such tubing have experienced a high rate of failures. Due to the high pressures of the gas, e.g., 1,000–2,000 psi, the couplings must be very tight and the plastic tends to flow therefrom, eventually causing the couplings to fail.

It is a primary object of the present invention to provide an improved connector for plastic tubing. Other objects are to provide such a connector which substantially overcomes the problems created by the cold flow characteristics of plastic; which is capable of withstanding high pressure; and which is relatively simple and uncomplicated. The manner in which these objectives are achieved will be apparent from the following description and appended claims.

SUMMARY OF THE INVENTION

In accordance with the invention, there is provided a connector for plastic tubing which comprises a relatively rigid tubular insert in the end of the tubing. A tubular sleeve is positioned over the tubing. Tubular coupling means is provided which engages the plastic tubing and the tubular sleeve and defines an internal shoulder axially spaced from the sleeve. Elastomeric means are provided which encircle the tubing intermediate the shoulder and tubular sleeve and are compressed therebetween.

BRIEF DESCRIPTION OF THE DRAWING

The invention is illustrated in the accompanying drawing wherein:

FIG. 1 is a perspective view of a completed connector in accordance with this invention;

FIG. 2 is an exploded view illustrating the various elements of the connector of FIG. 1;

FIG 3 is an enlarged cross section taken substantially along the line 3—3 of FIG. 1;

FIG. 4 is a cross section illustrating the formation of a modified connector; and FIG. 5 is a view similar to that of FIG. 4, illustrating the completed connector.

DESCRIPTION OF THE PREFERRED EMBODIMENTS

With particular reference to the drawing, there is illustrated a connector for the end of a section of plastic tubing 10. While the actual dimensions are not critical and form no part of this invention, the external diameter of such tubing for use with a cryosurgical instrument may be, for example, .1 inch.

Into the end of the tubing 10 is inserted a tubular stainless steel insert 12. A tubular metal sleeve 14 is then slid over the end of the tubing. The end of sleeve 14 defines an annular flange 16. Next, a plurality of elastomeric O-rings 18 are also slid over the end of the tubing 10. A commercially available helical coil 20 is then mounted on the tubing. This is a coil of the type commonly used as an insert for forming internal threads and the wire forming the coil has a diamond shaped cross section. In this application, however, it is applied externally of the end of tubing 10. Its size is such that its normal internal diameter is smaller than the external diameter of the tubing. By use of commercially available equipment, the coil is expanded and, in its expanded condition, is positioned over the end of the tubing 10 and permitted to collapse. It then tightly engages the end of the tubing.

A coupling member 22 is the last element to be added. In external appearance, the coupling member 22 is cylindrical as will be seen from FIG. 2. However it will be noted from FIG. 3 that approximately one-third of its length comprises a relatively thin wall 24 which terminates at an inner shoulder 26. Extending from shoulder 26 is a portion with internal threads 28. This portion also terminates at a shoulder 30, and the remaining length of the coupling member 22 has a different internal thread 32.

The coupling member 22 is positioned over the end of tubing 10 and threaded thereon. The internal threads 28 engage the convolutions of coil 20, causing the coil to be compressed more tightly into the plastic tubing 10. When coupling member 22 has been fully threaded onto coil 20 as shown in FIG 3, the flange 16 of sleeve 14 is forced into the end of coupling member 22, compressing the elastomeric O-rings 18 between shoulder 26 and flange 16. The thin walled end of coupling member 22 is then crimped over the flange 16 as at 34, thereby retaining the O-rings in a compressed condition. Thereafter, a suitably threaded conduit 36 may be threaded into the coupling member 22.

It will be seen from the foregoing that coupling member 22 is, in effect, threaded on the tubing 10 through the medium of the coil 20, thus providing an axial grip on the tubing. As the plastic tends to flow outward from this region, the elastomeric O-rings 18 maintain a constant sealing pressure thereon, preventing failure of the connection.

In FIGS. 4 and 5 there is illustrated a modified version of the invention, which is quite similar to that of FIGS. 1–3. Accordingly, similar reference numerals are used for similar parts. The primary distinction between the two modifications is that in the FIG. 4 and FIG. 5 version, the helical coil is omitted. In place of coupling member 22, there is provided a modified member 22' in which the inner threads 28' are of a smaller diameter. This member is actually threaded onto the surface of the plastic tubing 10 to compress O-rings 18, the threads 28' partially biting into the surface of the plastic tubing, as illustrated in FIG. 4. Prior to the insertion of stainless steel insert 12, there was threaded through it a small wire 38 having at its end a ball 40 of slightly greater diameter than the internal diameter of the steel insert 12. After assembly, a force is exerted on wire 38, pulling the ball 40 through the steel insert 12, thereby causing it to expand as shown in FIG. 4. When the insert is fully expanded, the plastic material of the tubing 10 substantially fills the threads 28' as will be seen in FIG. 5 and the O-rings 18 are further compressed until each is almost square in cross section.

It will be apparent to those skilled in the art that other variations and modifications may also be made in this invention. Accordingly, the foregoing disclosure is to be construed as illustrative only, rather than limiting. This invention is limited only by the scope of the following claims.

We claim:

1. A connector for plastic tubing which comprises: a relatively rigid tubular insert in the end of said tubing; a tubular sleeve over said tubing; a helical coil tightly engaging said tubing; an internally threaded tubular coupling member threaded onto said coil and defining an internal shoulder axially spaced from said sleeve; and elastomeric means encircling said tubing intermediate said shoulder and tubular sleeve and compressed therebetween.

2. The connector of claim 1 wherein said elastomeric means comprises a plurality of O-rings.

3. The connector of claim 1 wherein said sleeve defines a radially extending flange and said tubular coupling member engages said flange.

4. A connector for plastic tubing which comprises: a relatively rigid tubular insert in the end of said tubing; a tubular sleeve over said tubing defining a radially extending flange; a tubular coupling member engaging said plastic tubing with its end crimped over said flange and defining an internal shoulder axially spaced from said sleeve; and elastomeric means encircling said tubing intermediate said shoulder and tubular sleeve and compressed therebetween.

5. The connector of claim 4 wherein said insert is a metal tube having an external diameter greater than the normal internal diameter of said tubing.

6. The connector of claim 5 wherein said elastomeric means comprises a plurality of O-rings.

7. The connector of claim 5 wherein said sleeve defines a radially extending flange and said tubular coupling member engages said flange.

8. A connector for plastic tubing which comprises: a tubular metal insert in the end of said tubing having an external diameter greater than the normal internal diameter of said tubing; a tubular sleeve over said tubing defining a radially extending flange; a tubular coupling member engaging said plastic tubing with its end crimped over said flange and defining an internal shoulder axially spaced from said sleeve; and elastomeric means encircling said tubing intermediate said shoulder and tubular sleeve and compressed therebetween.

9. A connector for plastic tubing which comprises: a tubular metal insert in the end of said tubing having an external diameter greater than the normal internal diameter of said tubing; a tubular sleeve over said tubing; internally threaded tubular coupling means threadedly engaging the surface of said plastic tubing, engaging said tubular sleeve, and defining an internal shoulder axially spaced from said sleeve; and elastomeric means encircling said tubing intermediate said shoulder and tubular sleeve and compressed therebetween.

* * * * *